(12) United States Patent
Kim et al.

(10) Patent No.: US 7,008,696 B2
(45) Date of Patent: Mar. 7, 2006

(54) OPTICAL FIBER PREFORM HAVING BARRIER LAYERS FOR HYDROXYL (OH) RADICALS

(75) Inventors: Sung-Jin Kim, Kumi-shi (KR); Sung-Koog Oh, Kumi-shi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 216 days.

(21) Appl. No.: 10/465,242

(22) Filed: Jun. 19, 2003

(65) Prior Publication Data

US 2004/0110007 A1    Jun. 10, 2004

(30) Foreign Application Priority Data

Dec. 10, 2002  (KR) ...................... 10-2002-0078122

(51) Int. Cl.
*B32B 17/02* (2006.01)

(52) U.S. Cl. ...................... 428/432; 428/697; 428/699; 428/701; 428/702

(58) Field of Classification Search ................ 428/375, 428/385, 432, 697, 699, 701, 702
See application file for complete search history.

(56) References Cited

U.S. PATENT DOCUMENTS

| 6,280,850 B1 * | 8/2001 | Oh et al. ..................... 428/428 |
| 6,530,244 B1 * | 3/2003 | Oh et al. ....................... 65/417 |

* cited by examiner

*Primary Examiner*—Deborah Jones
*Assistant Examiner*—Elizabeth D. Ivey
(74) *Attorney, Agent, or Firm*—Cha & Reiter, L.L.C.

(57) ABSTRACT

Disclosed is an optical-fiber preform having barrier layers to hydroxyl radicals, the optical-fiber preform comprising: a quartz tube in the form of a cylinder shape serving as a substrate for forming the optical-fiber preform; a first barrier layer for preventing hydroxyl radicals from permeating the optical-fiber preform and deposited onto the inner surface of the quartz tube; a second barrier layer having a permeation coefficient higher than the first barrier layer and deposited onto the first barrier layer; a third barrier layer having a permeation coefficient lower than the second barrier layer and deposited onto the second barrier layer; and, a core layer being located at the center of the optical-fiber preform.

5 Claims, 2 Drawing Sheets

OPTICAL FIBER PREFORM HAVING BARRIER LAYERS FOR HYDROXYL (OH) RADICALS

CLAIM OF PRIORITY

This application claims priority to an application entitled "Optical fiber preform having barrier layers to hydroxyl radicals," filed in the Korean Intellectual Property Office on Dec. 10, 2002 and assigned Serial No. 2002-78122, the contents of which are hereby incorporated by reference.

BACKGROUND OF THE INVENTION

1. Field of the Invention

The present invention relates to an optical-fiber preform produced according to a modified chemical-vapor deposition process, and more particularly to an optical-fiber preform having barrier layers to prevent hydroxyl radicals (OH radicals).

2. Description of the Related Art

An optical-fiber preform is a raw material used for fabricating an optical fiber. The optical-fiber preform includes a core layer with a high refractive index, a clad layer surrounding an outer surface of the core layer, and a quartz tube in the form of cylindrical tube serving as a substrate for the optical-fiber preform. The core layer has a refractive index higher than that of the clad layer. Thus, an optical signal incident on the core layer causes a total reflection at an interface between the clad layer and the core layer, so that the transmission of the optical signal is achieved in the core layer.

In order to produce the optical-fiber preform, a method known as a modified chemical-vapor deposition is widely used, in which chemical reactants resulting from a thermal reaction are deposited on the inner surface of a quartz tube to form an optical preform. During the modified chemical-vapor deposition, an inside of the quartz reaction tube is maintained at a high temperature by heating the quartz reaction tube and then a raw material gas is introduced into the quartz reaction tube. As such, a chemical reactant is produced by heating the raw material gas onto the inner surface of the quartz reaction tube. Accordingly, the modified chemical-vapor deposition is performed by depositing the raw material gas onto the inner surface of the quartz reaction tube by heating the quartz reaction tube, collapsing the quartz reaction tube by heating it above a softening temperature, and closing the quartz reaction tube. This method is widely used for producing an optical-fiber preform of a hill type because it is easy to control the distribution of the refractive index.

In the above mentioned method, however, an oxygen/hydrogen burner heating a quartz tube, which contains hydroxyl radicals (—OH), generates hydroxyl radicals during the process of manufacturing the optical-fiber preform. The hydroxyl radicals permeate inside the optical-fiber preform due to a concentration gradient between the quartz reaction tube, the clad layer, and the core layer. The hydroxyl radicals that permeate inside the optical-fiber preform cause changes in the refractive index of the clad layer or the core layer. As a result, errors disturbing the optical signal occur. Moreover, the hydroxyl radicals that permeate the core layer tend to form a non-bridging oxygen, thereby degrading the uniformity in the construction of the core layer. Accordingly, the presence of the hydroxyl radicals leads to many disorders and disturbance in the optical signal.

FIG. 1 shows a construction of an optical-fiber preform having a barrier layer for the hydroxyl radicals and a profile of a refractive index of the optical-fiber preform. As shown in FIG. 1, the optical-fiber preform 110 includes a quartz tube 113, a clad layer 112, a core layer 111 located at the center of the optical-fiber preform 110, and a barrier layer 114. Note that hydroxyl radicals are deposited between the quartz reaction tube 113 and the core layer 111.

The quartz reaction tube 113 serves as a substrate when producing the optical-fiber to preform 110 and is produced using a sol-gel method. The clad layer 112 surrounds an outer surface of the core layer 111 and has a distribution of the refractive index that is lower than that of the core layer 111. Accordingly, an optical signal incident on the core layer 111 causes a total reflection within the core layer 111 for transmission. The barrier layer 114 for the hydroxyl radicals includes the composition of $SiO_2$ or $SiO_2 + GeO_2$ and prevents the hydroxyl radicals from permeating the core layer 111 and the clad layer 112.

Referring to the profile of the refractive index of the optical-fiber preform 110, the core layer 111 has the highest refractive index, and the clad layer 112 has the lowest refractive index. The refractive-index distribution of the barrier layer 114 is lower than that of the core layer 111 but higher than that of the clad layer 112. Meanwhile, the refractive index distribution of the quartz reaction tube 113 is higher than that of the barrier layer 114 but lower than that of the core layer 111. As shown in FIG. 1, the barrier layer 114 and the clad layer 112 have negative refractive-index distributions ($\Delta N^-$) with reference to the refractive index of the quartz reaction tube 113. In contrast, the core layer 111 has a positive refractive-index distribution ($\Delta N^+$) greater than the refractive index of the quartz reaction tube 114.

U.S. Pat. No. 6,280,850, which is entitled with "Optical fiber preform having OH barrier and Manufacturing method thereof" and issued to Sungkuk Oh, discloses a construction of an optical-fiber perform, which includes barriers to hydroxyl radicals disposed between a quartz tube and a clad layer and between the clad layer and the core layer in order to prevent the hydroxyl radical from permeating the core layer. In particular, material such as $SiO_2$, $GeO_2$, etc., is employed as the barrier to the hydroxyl radicals. In addition, the barrier deposited between the clad layer and the core layer is doped with F, so that the refractive index thereof is regulated to equal that of the clad layer.

However, the optical-fiber preform having the conventional barrier to the hydroxyl radicals as stated above induces a self-collapsing problem due to excessive heating, which reduces the inner diameter of a quartz reaction tube and the diameter of the core at the center of the quartz reaction tube. This prevents heat from being smoothly transferred while the optical-fiber preform is turning to glass. Furthermore, the reduction of the inner diameter of the quartz reaction tube leads to the reduction of the thickness of the core layer capable of being deposited, which in turn reduces the length of the optical fiber capable of being drawn from a unit of preform.

Therefore, there is a need for an optical-fiber perform with an improved barrier layer capable of overcoming the above-mentioned drawbacks.

SUMMARY OF THE INVENTION

The present invention is related to an optical-fiber preform that can reduce the thickness of barrier for the hydroxyl radicals and prevent self-collapsing of the quartz reaction tube, while preventing the hydroxyl radical from permeating the core layer, by depositing multi-layered barriers formed with materials having different permeation coefficients.

One embodiment of the present invention provides an optical-fiber preform having barrier layers for the hydroxyl radical which includes: a quartz tube in the form of a cylinder serving as a substrate for forming the optical-fiber preform; a first barrier layer for preventing hydroxyl radicals from permeating the optical-fiber preform and being deposited onto the inner surface of the quartz tube; a second barrier layer having a permeation coefficient higher than that of the first barrier layer and being deposited onto the first barrier layer; a third barrier layer having a permeation coefficient lower than that of the second barrier layer and being deposited onto the second barrier layer; and a core layer being located at the center of the optical-fiber preform.

Another embodiment of the present invention provides an optical-fiber preform with a number of barrier layers made from different compositions, so that total thickness of the barrier layers for the hydroxyl radical can be reduced.

BRIEF DESCRIPTION OF THE DRAWINGS

The above features and advantages of the present invention will be more apparent from the following detailed description taken in conjunction with the accompanying drawings, in which.

DETAILED DESCRIPTION OF THE PREFERRED EMBODIMENTS

Figure 1:
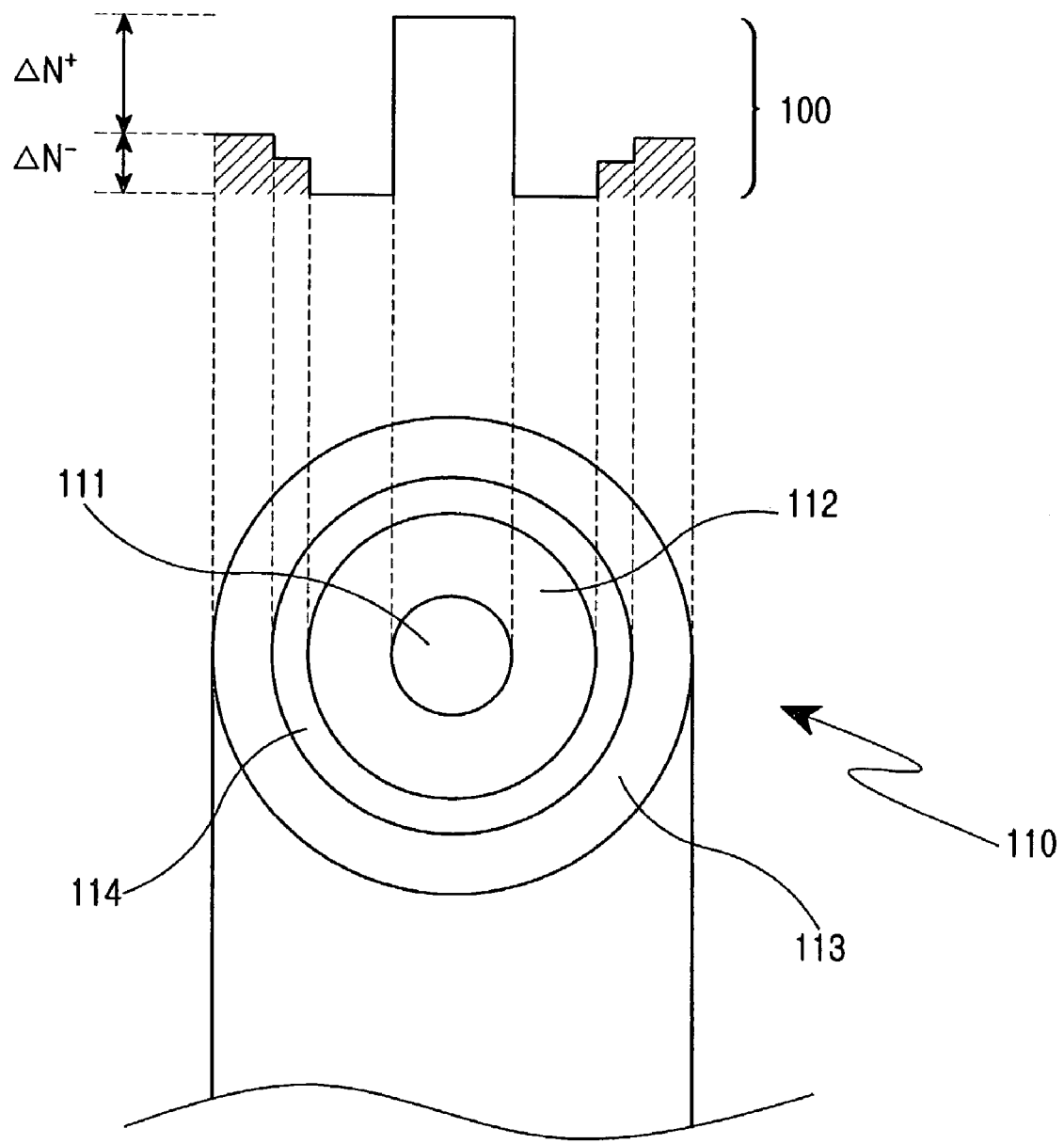
FIG. 1 is a cross-sectional view showing a profile of a refractive index and a construction of an optical-fiber preform according to the prior art.

Hereinafter, a preferred embodiment of the present invention will be described with reference to the accompanying drawings. In the following description and drawings, the same reference numerals are used to designate the same or similar components, and so repetition of the description on the same or similar components will be omitted.

According to the teachings of the present invention, a quartz tube is heated to form a high temperature state, then a raw material gas is introduced into the quartz reaction tube. Thereafter, the reactants produced during the heat application to the raw material gas are deposited onto the inner surface of the quartz reaction tube. The raw material gas used for the deposition includes silicon tetra chloride ($SCl_4$), germanium tetra chloride ($GeCl_4$), etc. The raw material mixed with oxygen $O_2$ is introduced into the quartz reaction tube. After depositing the raw material gas by heating the quartz reaction tube, the quartz reaction tube formed with a deposition layer is collapsed by heating it above the softening point and closing the quartz reaction tube.

Figure 2:
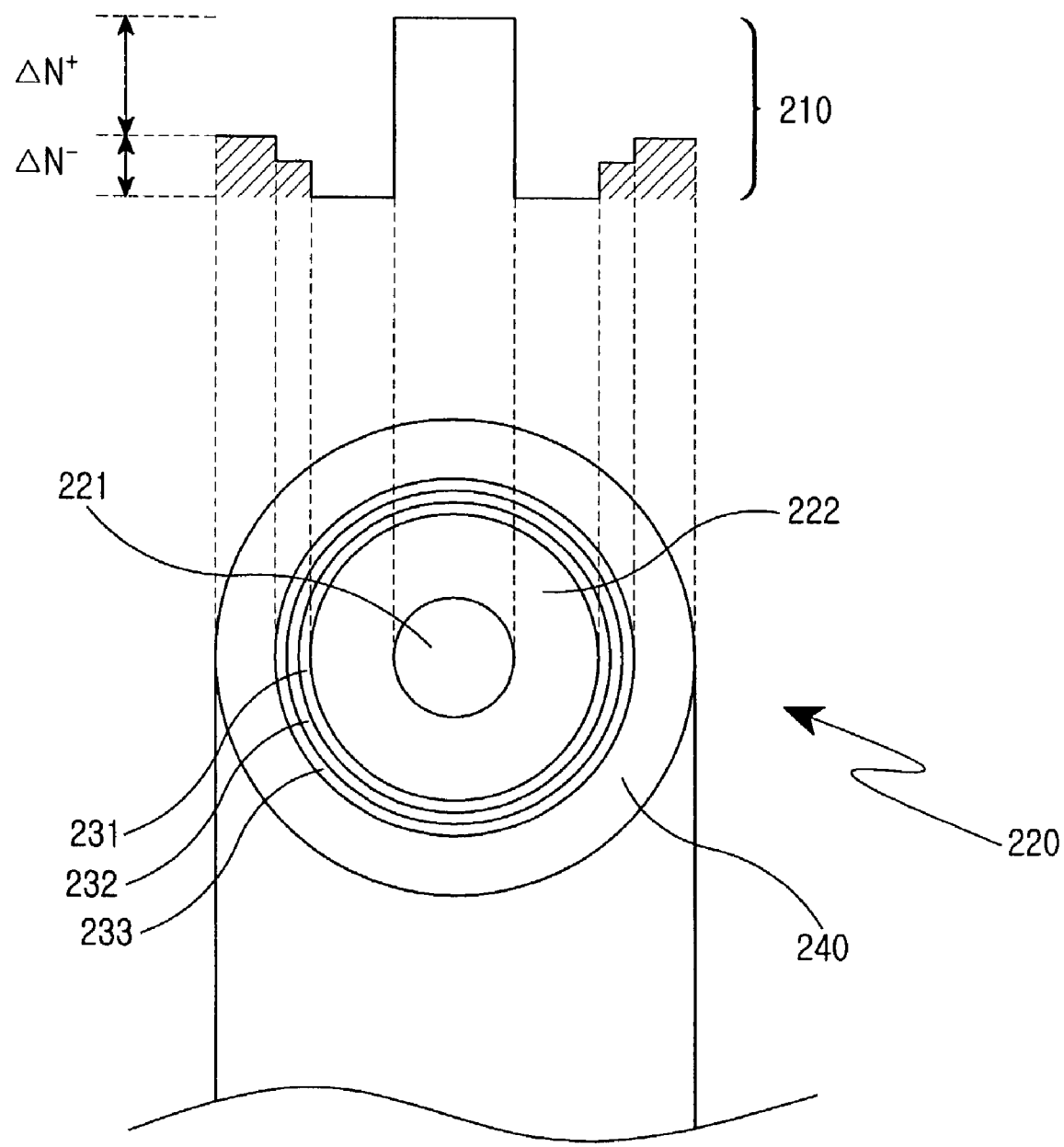
FIG. 2 is a cross-sectional view showing a profile of a refractive index and a construction of an optical-fiber preform according to the present invention.

FIG. 2 shows a construction of an optical-fiber preform with a plurality barrier layers for the hydroxyl radicals, and a profile of a refractive index according to the present invention. As shown in FIG. 2, the optical-fiber preform 220 includes a quartz tube 240, a first barrier layer 233, a second barrier layer 232, a third barrier layer 231, a clad layer 222, and a core layer 221, all of which are deposited onto inner surface of the quartz reaction tube 240.

The quartz tube 240 has a shape of a cylindrical tube fabricated by a sol-gel process and serves as a substrate for forming the optical-fiber preform.

The core layer 221 is located at the center of the optical-fiber preform 220 and has a refractive index higher than the first to the third barrier layers 233, 232, 231 and the clad layer 222.

The clad layer 222 has a refractive index lower than the core layer 221 and is deposited between the third barrier layer 231 and the core layer 221.

The refractive index of the core layer 221 is higher than that of the clad layer 222. An optical signal incident on the core layer 221 is totally reflected inwardly at an interface between the core layer 221 and the clad layer 222. During the modified chemical-vapor deposition process, the refractive index of the deposited layer is altered by changing the composition of the raw material gas introduced into the quartz reaction tube 240.

The first barrier layer 233 is deposited onto the inner surface of the quartz reaction tube 240 and serves to prevent the hydroxyl radicals from permeating the optical-fiber preform 220. More specifically, the first barrier layer 233 prevents the hydroxyl radicals, a portion of which comes from an oxygen/hydrogen burner for heating the quartz reaction tube 222 and the other portion of which is included in the quartz tube itself from permeating the optical fiber preform 220. The first barrier layer 233 employs material with a low permeation coefficient, such as $SiO_2$, etc.

The second barrier layer 232 employs materials, such as $P_2O_5$, $B_2O_3+SiO_2$, etc., which have a higher permeation coefficient than that of the first barrier layer 233, and is deposited onto the inner surface of the first barrier layer 233. The second layer 232 uses materials with a high absorption characteristic, such as $P_2O_2$, $B_2O_3 +SiO_2$, so that it can absorb the hydroxyl radicals that permeate the first barrier layer 233. The usage of material with as high absorption as the second layer 232 reduces the time and temperature to preform the deposition as the material has a melting temperature lower than that of pure $SiO_2$. The second barrier layer 232 can be deposited using a mixed composition of $P_2O_5$ and $SiO_2$.

As described above, the optical-fiber preform 220 according to the present invention includes a plurality of barrier layers to hydroxyl radicals, so that it is possible to reduce the deposition thickness of the $SiO_2$ with a high melting temperature, to shorten the time for heating the quartz reaction tube and to prevent the self-collapsing of the quartz reaction tube and the reduction of the core diameter due to the self-collapsing of the quartz tube as in the prior art.

The third barrier layer 231 is deposited on the inside of the second barrier layer 232 and is made of a material, such as $SiO_2$, which has a lower permeation coefficient than that of the second barrier layer 232. Note that the first barrier layer 233 and the third layer 231 have a lower permeation coefficient than that of the second barrier layer 232. The third layer 231 prevents the hydroxyl radical passing through the second barrier layer 232 from reaching the core layer 221.

As shown in the refractive index profile of the optical-fiber preform 220 in FIG. 2, the core layer 221 has the highest refractive index, and the clad layer 222 has a refractive index lower than those of the first barrier layer 233, the second barrier layer 232, and the third barrier layer 231. The first to the third barrier layers 231, 232, 233 and the clad layer 222 have negative refractive-index distributions ($\Delta N^-$) with reference to the refractive index of the quartz reaction tube 240. On the contrary, the core layer 221 has a positive refractive-index distribution ($\Delta N^+$) greater than the refractive index of the quartz reaction tube 240.

An optical-fiber preform according to the present invention includes multi-layered barrier layers to hydroxyl radicals, which are made from materials with different compositions and different permeation coefficients, so that it is possible to reduce the total thickness of the barrier layers. That is, the present invention reduces the number of silica barriers and deposits a multi-barrier layer a barrier for OH diffuse, thus reducing the loss of OH. Also, because the second barrier layer disposed between the first and the third barrier layers is made from material with a high absorption, efficiency of the hydroxyl radical prevention is improved.

Furthermore, by combining and staking materials having a deposition temperature lower than that of $SiO_2$, it is possible to reduce the deposition temperature and heating time that are required to heat the quartz reaction tube. In other words, by lower the deposition time and temperature, it is possible to prevent the quartz reaction tube from collapsing. As a result, the diameter of the core to be deposited can be increased and the optical-fiber preform can turn to glass smoothly. That is the ratio of D/d does not have to be big as in the prior art. Here, D represents the whole diameter of the optical fiber perform, and d represents the diameter of the core Although a preferred embodiment of the present invention has been described for illustrative purposes, those skilled in the art will appreciate that various modifications, additions, and substitutions are possible without departing from the scope and spirit of the invention as disclosed in the accompanying claims.

What is claimed is:

1. An optical-fiber preform comprising:
a quartz tube in the form of cylinder shape, defining the optical-fiber preform;
a first barrier layer, disposed onto the inner surface of the quartz reaction tube, for preventing hydroxyl radicals from permeating the optical-fiber preform;
a second barrier formed of $B_2O_3+SiO_2$ material and deposited on the inside of the first barrier, and includes a permeation coefficient substantially higher than the first barrier layer;
a third barrier having a permeation coefficient substantially lower than the second barrier layer, the third barrier deposited onto the second barrier layer;
a core layer disposed at the center of the optical-fiber preform; and,
a clad layer having a refractive index substantially lower than the core layer and deposited between the third barrier layer and the core layer.

2. An optical-fiber preform having a substrate tube, a cladding layer and a core layer, the optical-fiber preform further comprising a first barrier layer, deposited on the inside of the substrate tube, for preventing hydroxyl radicals from permeating the optical-fiber preform; a second barrier layer having a permeation coefficient substantially higher than the first barrier layer and deposited on the inside the first barrier layer; and, a third barrier layer having a permeation coefficient substantially lower than the second barrier layer and deposited inside the second barrier layer.

3. The optical-fiber preform as claimed in claim 2, wherein the first barrier layer and third barrier layer are made from $SiO_2$.

4. The optical-fiber preform as claimed in claim 2, wherein the second barrier layer is made from $P_2O_5$.

5. The optical-fiber preform as claimed in claim 2, wherein the second barrier layer is made from $B_2O_3+SiO_2$.

* * * * *